Aug. 22, 1933.       H. J. MURRAY       1,923,386
CLUTCH LOCK FOR SYNCHRONIZERS
Filed May 13, 1930       2 Sheets-Sheet 1

INVENTOR
HOWARD J. MURRAY
BY
Warren S. Orton
ATTORNEY

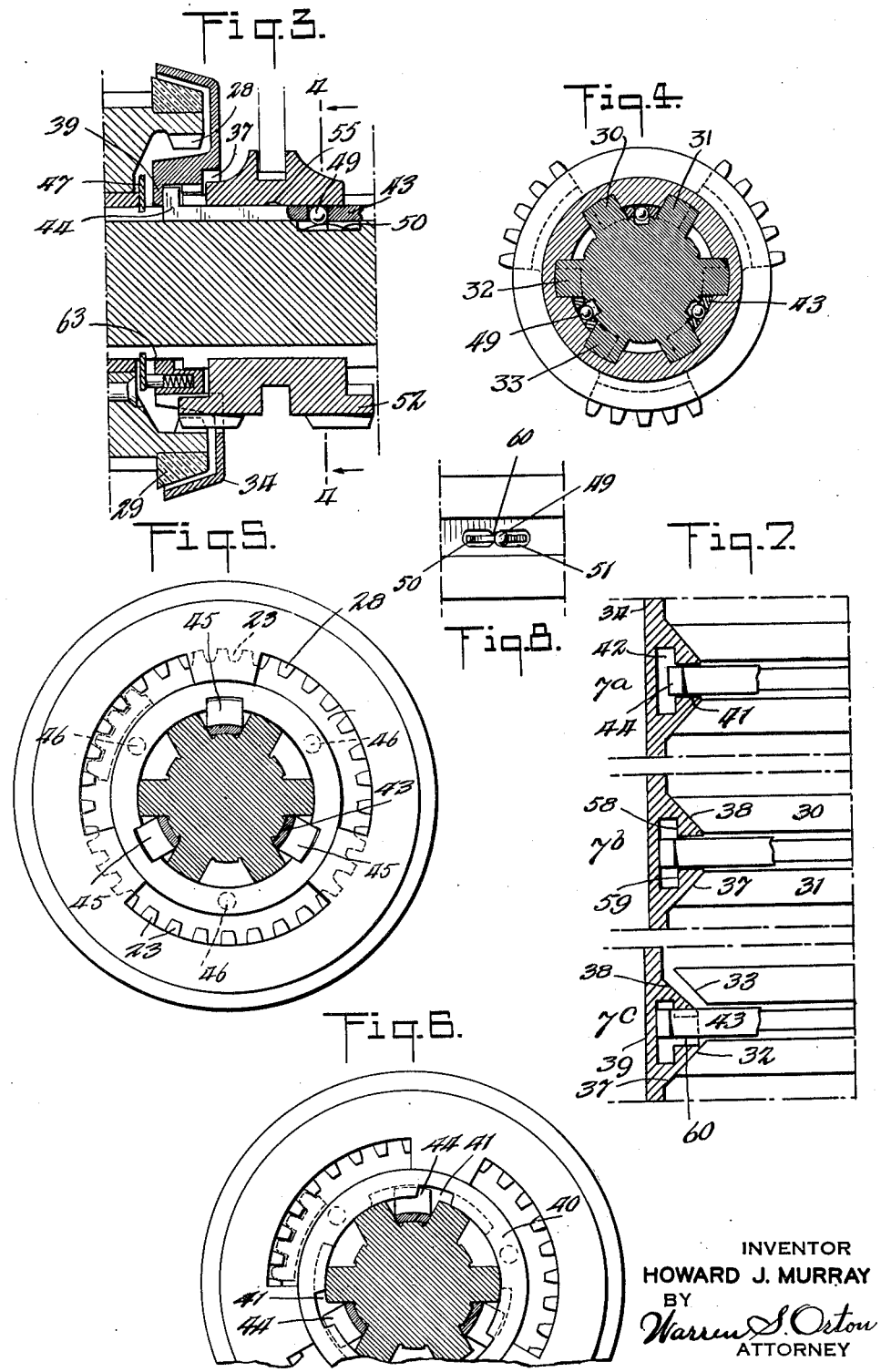

Patented Aug. 22, 1933

1,923,386

UNITED STATES PATENT OFFICE 1,923,386

CLUTCH LOCK FOR SYNCHRONIZERS

Howard J. Murray, New York, N. Y., assignor to R. M. Company, Inc., East Pittsburgh, Pa., a Corporation of Delaware Application May 13, 1930. Serial No. 452,118

22 Claims. (Cl. 192—53)

My invention relates to a synchronizing device of general application for use wherever it is required to bring two rotors to the same, or approximately the same, speed, and the invention is particularly designed for use in the variable speed transmission casing of an automotive vehicle, for use in those situations where it is desired to bring the members of the several gear sets selectively to the same, or approximately the same, speed before clutch elements connected to the selected gears to be meshed are moved into their interdental or positive driving position.

The primary object of the invention is to provide a simplified, improved form of synchronizing device which will function efficiently in situations where there are present conditions tending to cause such devices to fail to function, such as in the transmission casings where such devices are commonly employed and which are usually filled with lubricating grease or oil.

Synchronizing devices of the general type under discussion, and as hereinafter illustrated, commonly include a friction clutch for the purpose of establishing a friction drive between the driving gears or other rotors to be synchronized before the positive driving position is effected. When employed in automotive vehicle transmission casings the synchronizing device including the friction clutch parts are commonly disposed in a heavy lubricant oil or transmission grease which, under certain circumstances such as in cold weather, becomes quite rigid or semi-plastic, and tends to turn with the moving part. It has been found in practice that under such circumstances one of the friction clutch elements has a tendency to drag the other, even when the clutch elements are disposed in their spaced-apart, unclutched position, presumably due to the grease providing a driving connection between the clutch elements. Other conditions seem to affect this tendency of one of the clutch members to pick up and turn the other, such, for instance, as when the parts are turning at relatively high speed. This tendency of the friction clutches to operate when they are supposed to be in unclutched position defeats the effectiveness of the devices, and it not infrequently happens that two clutches being thus in a semi-driving position at the same time act against each other through the connected gear trains, causing normally inactive parts to be rotating under conditions where the most effective operation of the device requires that the gear parts be not rotating.

Accordingly, another object of the invention is to provide a form of synchronizer which will function efficiently as such and at the same time will defeat any such tendency of the clutch elements to rotate with each other under conditions where they should be independent of each other.

Accordingly, the invention features a locking device for securing the clutches from such dragging action, and an organization of parts designed to lock all of the synchronizing devices and arranged so that when a shift from neutral is made in connection with any particular gear set, only that friction clutch which is associated with the selected gear set would be unlocked, and all of the other clutches will be retained in their normal locked or non-dragging position.

Still another object of the invention is to provide a simplified form of mechanism operatively controlled in the case of an automobile transmission by the usual manually actuated shift rod, and in which the parts are arranged and coordinated so that as an incident of shifting the selected gear set the friction clutch controlling the gears of that set will be released from its locked position, moved into clutching position, and after synchronization has been effected the continued movement of the shift rod will cause the positive driving engagement of the selected gears.

Still another object of the invention is to provide, in connection with the parts thus featured, an arrangement for positively moving the friction clutch into an inoperative position in case its elements should become stuck together for any reason.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawings:

Fig. 3 is a view similar to the left side of Fig. 2, showing the position of the parts when the positive clutching connection has been effected, and showing the automatic release of the friction clutch elements.

Fig. 4 is a transverse sectional view taken on the line 4—4 of Fig. 3 looking in the direction indicated by the arrows.

Figure 1:
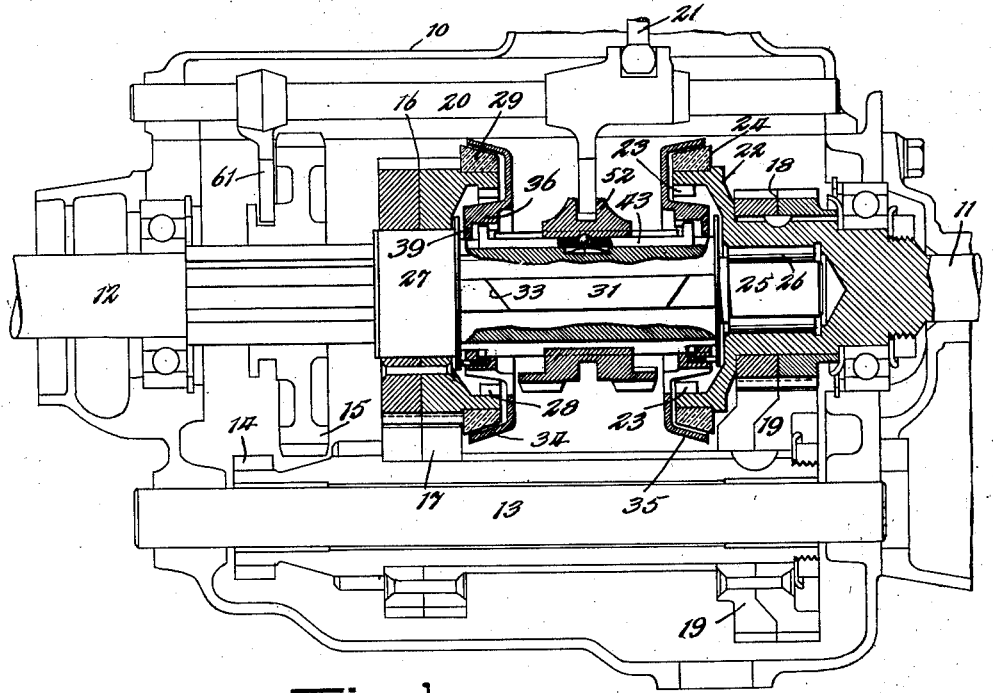
Fig. 1 is a view largely in diagrammatic outline, in light lines, of a conventional form of automobile transmission casing and contained elements, with a preferred embodiment of the invention shown therein in heavy lines, and showing the position of the parts forming the first or high and second speed drive when the gear sets are in neutral position.
Figure 2:
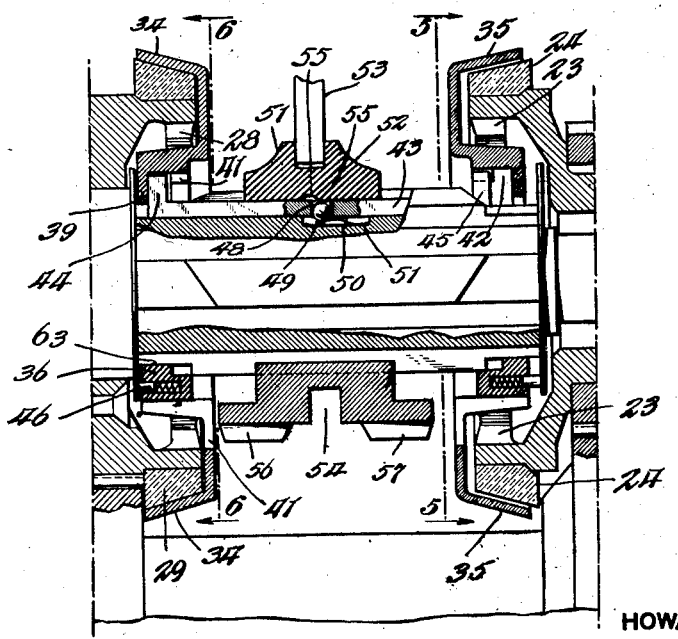
Fig. 2 is an enlarged showing of certain of the parts shown in Fig. 1, the control having been moved to the left to cause the friction clutch controlling the second speed set to become operative, and showing the disposition of the parts just before the positive clutching connection has been effected to attain second speed.

Figs. 5 and 6 are similar views taken respectively on the line 5—5 and 6—6 of Fig. 2, looking in the opposite directions as indicated by the arrows, and Fig. 7 is an explanatory view showing the successive relations of the locking key on the shaft in its engagement with the hub recesses in the floating clutch element shown in Figs. 1, 2, and 3;

Fig. 7ª showing the relation of the parts when in the locked position with the parts in neutral as shown in Fig. 1;

Fig. 7ᵇ showing the unlocked position with the clutch about to be meshed into clutching position as indicated in Fig. 2;

Fig. 7ᶜ showing the position of the parts corresponding to the showing in Fig. 3 with the friction clutch engaged, and also illustrating the position of the parts should the clutch become stuck with the necessity of positively shifting the same back towards neutral and into unclutched position;

Fig. 8 is an explanatory view showing in plan the key bar interlock.

In the drawings, and referring first to Fig. 1, there is shown a transmission casing 10 of conventional form, intruded into one end of which is the engine shaft 11, and extending from the opposite end of which is the wheel propeller shaft 12. Also mounted in the transmission is the usual jack shaft 13 and intermeshable gear sets 14—15 and constantly meshed gear sets 16—17, 18—19, connecting the jack shaft with the power shafts 12 and 11. The device also includes the shift rods, one of which is shown at 20, actuated by a shift lever 21, all as is well known in devices of this character.

The shaft 11 is enlarged at its inner end to form a hollow gear 22 provided with teeth 23 forming an internal clutch member, and also provided on its outer periphery with a cone ring 24 forming one element of a friction clutch. The shaft 12 has its inner end reduced as shown at 25, and this reduced end is mounted in an anti-friction device 26 contained within the hub of gear 22, following conventional practices in this respect.

The portion of the shaft 12 within the housing 10 is provided with a bushing 27 on which is rotatably mounted the gear 16. This gear is of a construction similar to the gear 22 in that it is provided with teeth 28 forming a dental clutch member, and is provided on its outer face with a cone ring 29 forming one of the elements of a friction clutch to connect shaft 12 with the jack shaft 13 through the gear set 16—17. The portion of the shaft between the bushing 27 and the reduced end 25 is provided with splines arranged in three pairs 30 and 31 as shown in Fig. 4. As noted in Fig. 7 the ends of each of the pairs of splines are beveled towards each other, as indicated at 32—33 to form cams for mechanically shifting the friction clutches into clutching position as hereinafter described. The construction of parts at each end of this splined portion of the shaft is similar to the other except for obvious reversal of position, so that the detailed description of one set of such parts is sufficient for the other.

Mounted on the smooth reduced bearing portion 63 of the shaft (see Fig. 2), just beyond the cams 32—33, is a coacting friction clutch element, the one forming the movable part of the clutch to the left of the figures being indicated by the reference character 34 for engagement with relatively fixed clutch element 29, and that to the right forming part of the high speed synchronizer designated 35, and arranged for engagement with clutch element 24. The coacting clutch element 34 or 35, as the case may be, is provided with a long hub 36, the inner faces of which are inclined towards each other as shown at 37 and 38, and coact with the cams 32 and 33 on the shaft to engage or to be engaged by the cams. By means of this construction slight relative rotary motion between the clutch element and the shaft causes the clutch element to be moved firmly into engagement with its relatively fixed clutch element carried by the rotative clutch members 22 or 16, as indicated more particularly in the showing in Fig. 7.

The hub 36 provides an inset bearing wall 39, and in spaced relation to the bearing wall is provided with an integral slotted flange 40 provided with circumferentially spaced slots or openings 41 in the clutch member, as shown particularly in Fig. 6. The spacing of the flange 40 from the wall 39 provides a clearance 42 for receiving the ends of a locking key bar (see Fig. 7).

Mounted between each of the pairs of splines on the shaft is a plurality (in this case shown to be three) of keybars 43 turning with the shaft and capable of slight movement along the length of the shaft to and from clutch locking positions. The bar 43 is provided at opposite ends with outstanding fingers 44 and 45 and these fingers are so spaced apart that when one of the fingers is in one of the openings 41 of one friction clutch element the other finger 45 is similarly in the opening 41 of the other clutch element to lock both friction clutches in inoperative position, as particularly illustrated in the showing in Figs. 1 and 7ª. The parts are so proportioned that when the keybar has been shifted in one direction, such as when shifted to the left as shown in Fig. 2, the finger 44 will be beyond its associated opening 41 and contained in the clearance 42, as shown in Figs. 2 and 7ᵇ, thus unlocking the clutch element 34 from the shaft 12, but while clutch element 34 is thus unlocked engagement with the clutch element 35 at the right of the figures is maintained.

The clutch elements are normally maintained in their spaced apart, inoperative, unclutched position by means of a plurality of spring pressed plungers 46, carried by the hubs 36, and having their free ends bearing against stop plates 47 contained in grooves formed in the splines of the shaft as particularly shown in Fig. 3.

Each of the sliding keybars 43 is provided at the center thereof with an opening 48 extending therethrough, and in which opening is contained a ball 49, normally maintained in outwardly projected position by means of a flat spring 50 contained in a recess 51 formed in the outer face of the shaft and between the pairs of splines as shown in Fig. 4.

A manually actuated, rugged power transmitting sliding member 52 is positioned between the friction clutches, is keyed to the shaft to turn therewith, and is mounted to slide selectively in either direction by the actuation of a fork 53 seated in a groove 54 encircling the shiftable member, and which fork 53 is the conventional shift fork secured to shift rod 20 as is usually found in transmission mechanism of the type illustrated. The portion of the shiftable member which aligns with the opening 48 is provided with a semi-spherical recess 55 designed to receive the ball 49 and provide a slip connection between the shiftable member 52 and the keybar 43, so that the shifting of the shiftable member will carry with it the locking keybar and permit the escape of the shiftable member from the locking keybar when the latter abuts and is stopped by the shifted clutch element against which it bears as shown in Fig. 3. The sliding member 52 is provided on opposite ends thereof with longitudinally projecting sets of teeth 56 and 57, adapted to engage respectively with the teeth 28 and 23 to provide a positive drive connection selectively between the shaft and either the gear 16 or 22, depending upon the direction that the shiftable member was moved. The clearance 42 has some length considered circumferentially and forms walls 58 and 59 on each side of the opening 41 in the hub which receives the locking key 43.

The recess 51 extends longitudinally of the shaft 12 and as noted in Fig. 8 has stop fingers 60 projecting laterally towards each other and disposed so that the clearance between them is slightly less than the diameter of the ball 49 so that the ball cannot pass from one end of the recess to the other except when recess 55 is disposed in position to permit the ball to ride over the stop fingers.

In operation, and referring first to the neutral condition of the parts shown in Fig. 1, it will be noted that the spring pressed plungers 46 are, in each case, acting on their respective friction clutches to maintain the same in an inoperative, non-clutching position. It will also be noted from the showing in this figure that the outturning ends of the locking keybar engage both of the floating clutch elements 34 and 35 so that these elements are either turning with the shaft or are fixed in place in case the shaft is not turning, and that this condition will be maintained irrespective as to whether the associated clutch elements carried by gears 16 and 22 are rotating or not. This means that under normal conditions, and with the parts at neutral, there has been eliminated any tendency of the disconnected clutch elements to turn one another, even though they be close to each other.

Assuming that it is desired to make one of the several possible gear shifts, such, for instance, as the driving of shafts 12 and 13 one from the other through the permanently meshed gears 16 and 17, it will be understood that shifting lever 21 will act through rod 20 to move the same in one direction, say, to the left of the showing in Fig. 1. The initial part of this movement will cause the parts to assume the position shown in Fig. 2 and in which finger 44 has been shifted to the left out of the opening 41 thus unlocking clutch element 34 from its fixed connection with the shaft. The continued movement of the shift rod will cause finger 44 to bear against wall 39 shifting the clutch element 34 axially on the shaft and into clutching position as indicated in Fig. 2. This will cause clutch element 34 to turn with, or be turned by, the clutch element 29 and the reactory tendency of the shaft or floating clutch element to turn relative to each other will cause the cam face 32 or 33, as the case may be, depending upon the direction of rotation, to force the friction clutch element 34 firmly into its clutching position, as suggested in the showing in the Fig. 7c, and this slight rotary movement between the shaft and floating clutch element will cause the finger 44 to be shifted back of the shoulder 58. The clutch thus moved into operative position will cause a driving connection between the shaft 12 and the jack shaft 13 through the gear set 16—17. As the sliding member moves to the left, from the showing in Fig. 2, it will ride over and depress the ball 49 shifting it downwardly into recess 50 as indicated in Fig. 3, thus permitting the shiftable member to move from the position shown in Fig. 2 into the position shown in Fig. 3 and eventually causing clutch teeth 56 to engage with and positively drive gear 16 through its engagement with teeth 28 or gear 16 drives the sliding member 52 depending on whether the driving force comes from the engine or from the vehicle wheels as when the vehicle is coasting. The shifted lock bar, thus being freed from the actuating force of the shiftable member, ceases its pressure against the shiftable clutch member thus permitting the plungers 46 to react and restore the clutch element to its normal non-operative position, as shown in Fig. 3.

When it is desired to restore the parts to their normal neutral position, the shift lever is actuated conventionally to shift rod 20 to the right. This will have the effect of also moving the shiftable member 52 from the position shown in Fig. 3 towards the right and into the position shown in Fig. 1. In order to avoid any tendency of the shift member 52 to carry locking bar 43 in advance of itself and into position to cause the right hand friction clutch to function, the construction shown in Fig. 8 is provided. As the ball 49 cannot move past the fingers 60 until the sliding member 52 is disposed approximately in its centered position, the parts will at this time be in the position shown in Fig. 3 where the sliding member 52 is free to slide along the shift bar without moving it and this will continue until the shift member reaches its centered position as shown in Fig. 1 when the slip clutch connection between the sliding member 52 and the shift rod 43 is restored. During the final movement of this shifting to the right, the shiftable member will pick up the ball due to the action of the spring 50 and act therethrough to shift the locking bar into its position centered between the friction clutches. This movement of the locking bar to the right will cause finger 44 to engage shoulder 58 or 59 and in this way draw the clutch element into an unclutched position, if it is not already in that position, and cause the inclined surface 37 or 38 to slide down the inclined mating cams 32 or 33 thus slightly rotating the clutch element if necessary to permit the finger to leave the clearance and reposition itself in the recess 41, as indicated in Figs. 1 and 7ª, and the parts are thus restored to their neutral position, ready for any subsequent synchronization and resetting of selected gear sets.

By means of a device of the character described there has been obtained a highly efficient form of synchronizing device which avoids objections heretofore present in devices of this character, where the turning of the clutches in lubricant and other liquids had a tendency to cause the friction clutches to function under conditions where they are required to be inactive.

I claim:

1. In a device of the class described, the combination of a shaft, a gear mounted for rotary movement on the shaft and provided on one side with clutch teeth and also provided with an element of a friction clutch, said shaft provided with splines having beveled ends, a coacting clutch element mounted on the shaft for a slight freedom of rotary movement and provided with cam faces adapted to engage or to be engaged by said beveled ends of the splines and said coacting clutch element forced by said beveled ends and cam faces into clutching engagement with the clutch element on the gear, said coacting clutch element provided with a hub portion forming a bearing wall on the end thereof adjacent the gear, having a locking tooth in spaced relation to the wall to form a clearance between the wall and teeth, spring pressed means between the shaft and said hub tending to maintain the friction clutch in an inoperative, unclutched position, a key bar splined to the shaft, slidable longitudinally along the same and having a part adapted in one position to engage said locking tooth to cause the coacting clutch element to turn with the shaft, and adapted in another position to bear on said bearing wall to shift the coacting clutch element into position to cause the friction clutch to become operative, a power transmitting sliding member splined to the shaft and having teeth on one end adapted to engage the clutch teeth on the gear thereby to provide a positive driving connection between the gear and shaft and a slip connection between said sliding member and the keybar and said sliding member and keybar organized with said slip connection whereby the initial movement of the sliding member towards its positive driving connection with the gear will first cause the keybar to be moved out of its locking engagement with the locking tooth and into bearing engagement with the coacting clutch element to cause the clutch to become operative and finally to effect the positive driving connection between the gear and the power transmitting slidable member.

2. In a device of the class described, the combination of a shaft, a gear mounted for rotary movement on the shaft and provided on one side with clutch teeth and also provided with an element of a friction clutch, said shaft provided with splines having beveled ends adjacent said teeth and clutch element, a coacting friction clutch element mounted on the shaft for a slight freedom of rotary movement and adapted to engage or be engaged by said beveled ends of the splines and forced thereby into clutching engagement with the clutch element on the gear, said coacting clutch element provided with a hub portion forming a bearing wall having a locking tooth in spaced relation to the wall to form a clearance between the wall and tooth, a keybar splined to the shaft, slidable longitudinally along the same and having an outturned end adapted in one position to engage said tooth to cause the coacting clutch element to turn with the shaft, and adapted in another position to bear on said bearing wall to shift the coacting clutch element into position to cause the clutch to become operative, a power transmitting slidable member splined to the shaft and having clutch teeth on one end adapted to engage the clutch teeth on the gear thereby to provide a positive driving connection between the gear and shaft and a slip connection between said sliding member and the keybar whereby the initial movement of the sliding member towards its positive driving connection with the gear will first cause the keybar to be moved out of its locking engagement with the locking tooth on the coacting clutch element, to cause the clutch to become operative and finally effect the positive driving connection between the shaft and gear.

3. In a device of the class described, the combination of a splined shaft, two rotative toothed members longitudinally spaced apart, mounted for rotary movement about the axis of said shaft and otherwise fixed relative to said axis, each of said members provided with an element of a friction clutch, each of said elements also provided with a coacting floating clutch element thereby to form two spaced-apart friction clutches, a third toothed member splined to the shaft to turn therewith, movable in one direction to provide a positive drive with one of the first named rotative tooth members and movable in the opposite direction to provide a positive drive with the other of such rotative members, a keybar splined to the shaft to turn therewith and having a slight freedom of axial movement between the rotative members, each end of said bar and its adjacent clutch element provided with coacting means adapted when the bar is centered between the members to engage both of said coacting, floating clutch elements to cause both of them to be held in rotatively fixed relation to the shaft and to turn therewith, and said bar movable selectively in either direction and being so proportioned in length that when so moved it escapes from its holding engagement with the element on the advancing end, while retaining its holding engagement with the clutch element on the rear end, and said advancing end adapted to bear on the adjacent clutch element to shift the same into its friction clutching position, and each of said friction clutches provided with means tending normally to maintain the clutch elements in a spaced apart, inoperative, non-clutching position, and releasable means controlled by the said third member for shifting the keybar to and from its friction clutch controlling positions.

4. In a device of the class described, the combination of a splined shaft, two toothed members longitudinally spaced apart, mounted for rotary movement about the axis of said shaft and otherwise fixed relative to said axis, each of said members provided with an element of a friction clutch, each of said elements provided with a coacting floating clutch element thereby to form two spaced-apart friction clutches, a third toothed member splined to the shaft to turn therewith, movable in one direction to provide a positive drive with one of the first named relative tooth members and movable in the opposite direction to provide a positive drive with the other of such rotative members, a keybar splined to the shaft to turn therewith and having a slight freedom of axial movement between the rotative members, each end of said bar and its adjacent clutch element provided with coacting means adapted when the bar is centered between the members to engage said coacting, floating clutch elements to cause both of them to be held in rotatively fixed relation to the shaft and turn therewith, and said bar movable selectively in either direction and being so proportioned in length that when so moved it escaped from its holding engagement with the element on the advancing end while retaining its holding engagement wtih the clutch element on the rear end, and said advancing end bearing on the adjacent clutch element to shift the same into friction clutching position, and releasable means controlled by the said third member for shifting the keybar to and from its friction clutch controlling positions.

5. In a device of the class described the combination of two members provided with clutching means adapted to be moved into position to establish a positive driving connection between the members, synchronizing means for causing the members to approach the same speed prior to assuming said positive driving connection, said synchronizing means including a friction clutch for establishing a friction drive between the members, means controlled by the position of said members when in an unclutched position for locking the friction clutch in an inoperative unclutched position, means normally tending to maintain the friction clutch in its inoperative unclutched position, and a control for shifting one of the members towards its positive driving connection with the other, said control acting on the locking means to release the same, and acting through said locking means to cause it to bear on and thus shift the friction clutch into an operative clutching position.

6. In a device of the class described, the combination of two members provided with clutching means adapted to be moved into position to establish a positive driving connection between the members, synchronizing means for causing the members to approach the same speed prior to assuming said positive driving connection, said synchronizing means including a friction clutch for establishing a friction drive between the members, means controlled by the position of said members when in an unclutched position for locking the friction clutch in position to prevent accidental movement into its operative clutching position, and a control for shifting one of the members towards its positive driving connection with the other, acting on the locking means to release the same and acting through said locking means to cause it to bear on and thus shift the friction clutch into an operative clutching position.

7. In a device of the class described, the combination of a shaft, a rotative member mounted for rotary movement about the axis of the shaft. an axially shiftable member splined to the shaft and adapted to be moved into positive driving connection with said rotative member to cause the same to turn with the shaft, synchronizing means for causing the shaft and member to approach the same speed, said synchronizing means including a friction clutch between the rotative member and the shaft, means including a locking finger controlled by the position of the shiftable member when removed from its positive driving position for locking the friction clutch in an inoperative, non-clutching position and actuated incidental to the shifting of said shiftable member towards its positive driving position for successively unlocking the friction clutch and for moving the same into its clutching position, a releasable connection between said shiftable member and said locking means for permitting the shiftable member to move into its positive driving position after it has caused the friction clutch to function, and means operable on the friction clutch for disposing the same in its inoperative, non-clutching position when released from said locking and shifting means.

8. In a device of the class described, the combination of a shaft, a rotative member mounted for rotary movement about the axis of the shaft, a shiftable member splined to the shaft and adapted to be moved into positive driving connection with said rotative member to cause the same to turn with the shaft, synchronizing means for causing the shaft and gear to approach the same speed, said synchronizing means including a friction clutch between the rotative member and the shaft, means including a locking finger controlled by the position of the shiftable member when removed from its positive driving position for locking the friction clutch in an inoperative, non-clutching position and actuated incidental to the shifting of said shiftable member towards its positive driving position for successively unlocking the friction clutch and for moving the same into its clutching position, and a releasable connection between said shiftable member and said locking means for permitting the shiftable member to move into its positive driving position after it has caused the friction clutch to function.

9. In a device of the class described, the combination of a shaft, a rotative member mounted for rotary movement about the axis of the shaft, a shiftable member splined to the shaft and adapted to be moved into positive driving connection with said rotative member to cause the same to turn with the shaft, synchronizing means for causing the shaft and gear to approach the same speed, said synchronizing means including a friction clutch between the rotative member and the shaft, means including a locking finger controlled by the position of the shiftable member when removed from its positive driving position for locking the friction clutch in an inoperative, non-clutching position and actuated incidental to the shifting of said shiftable member towards its positive driving position for successively unlocking the friction clutch and for moving the same into its clutching position.

10. In a device of the class described the combination of a shaft, a friction clutch mounted on the shaft, one of the elements of said clutch provided with a bearing wall and with a tooth positioned in advance of the wall and forming a clearance between the wall and tooth, a key splined to the shaft to turn therewith and having an axial movement along the shaft, said key having a finger at one end adapted in one shifted position of the key to engage the tooth on the clutch element thereby to fix said clutch element rotatively relative to the shaft, and said finger when shifted into said clearance permitting relative rotary movement between the shaft and said clutch element, and said key adapted when shifted into bearing engagement with said wall to cause the clutch to become operative, and camming means operatively controlled by the rotative movement of the clutch element relative to the shaft to cause the shaft to rotate the clutch element slightly about the axis of the shaft.

11. In a device of the class described, the combination of a shaft, a friction clutch mounted on the shaft, one of the elements of said clutch provided with a bearing wall, and a tooth in advance of the wall forming a clearance between the wall and tooth, a key splined to the shaft to turn therewith and having an axial movement along the shaft, said key having a finger at one end adapted in one shifted position of the key to engage the tooth on the clutch element thereby to fix said clutch element rotatively relative to the shaft, and said finger when shifted into said clearance permitting relative rotary movement between the shaft and said clutch element, and said key adapted when shifted into bearing engagement with said wall to cause the clutch to become operative.

12. In a device of the class described, the combination of a friction clutch mounted for rotary movement, and the elements of which clutch may have a tendency to drag one another even when disconnected, means acting to maintain the elements in spaced relation thereby to maintain the clutch in an inoperative, non-clutching position, and locking means having two spaced apart operative positions, in one engaging one of the clutch elements to hold the same positively from any rotative tendency to follow the other clutch element and in the other position acting on said clutch element to move it into its operative clutching engagement with its coacting element.

13. In a device of the class described, the combination of two members to be moved into interdriving relation, synchronizing means for causing the members to approach the same speed, said synchronizing means including a friction clutch for establishing a friction drive between the members, springs acting between the elements of the friction clutch and tending to maintain the clutch in a normal inoperative condition, and manually controlled means operatively connected to the friction clutch when moved in one direction for causing said friction clutch to become operative and when moved in the other direction for permitting the springs to function and for positively causing said friction clutch to become inoperative.

14. In a device of the class described, the combination of two members adapted to be moved into interdriving relation, synchronizing means for causing the members to approach the same speed, said synchronizing means including a friction clutch for establishing a friction drive between the members, manually controlled means operatively connected to the friction clutch when moved in one direction for causing said friction clutch to become operative and when moved in the other direction for causing said friction clutch to become inoperative, and for causing the elements of the friction clutch to become fixed relative to each other, and spring means acting between said clutch elements and tending to maintain the friction clutch in its unclutched, inoperative position when free of said manually controlled means.

15. In a device of the class described, the combination of two dental members adapted to provide a positive driving connection therebetween, means for causing one of said members to approach the speed of the other, said means including a friction clutch, with one element connected to turn with one of the dental members and the other element constituting a shiftable element in one position connected to turn with the other dental member and said clutch elements having a tendency to drag one another even when disconnected, an axially shiftable locking member provided with a locking finger disposed in one position to engage said shiftable clutch element to restrain the same positively from rotary movement in its tendency to follow the other clutch element and said locking member adapted to be moved in one direction out of said position restraining the rotary movement of the shiftable clutch element thus permitting a freedom of rotary movement of the shiftable clutch element and then into position in bearing engagement with said element to shift the same into position to cause the friction clutch to become operative.

16. In a device of the class described, the combination of a shaft, a friction clutch having both elements mounted for rotary movement about the axis of the shaft and which elements have a tendency to drag one another even when disconnected, one of said elements being shiftable axially relative to the other, said shiftable clutch element provided with a stop member, a key-bar splined to the shaft and adapted in one position to engage said stop member to lock the same to turn with the shaft, and said shiftable element provided with a wall disposed at all times in advance of the key-bar and adapted to be engaged thereby to shift the element into its clutching position, said key-bar being out of engagement with said stop member when in position engaging said wall.

17. In a device of the class described, the combination of two dental members adapted to be moved into a positive interdriving relation, synchronizing means for causing the members to approach the same speed, said synchronizing means including a friction clutch for establishing a friction drive between the members, said friction clutch including a shiftable member, a locking device adapted in one position to engage the shiftable member to lock it to the locking device and thus prevent relative rotary movement between said locking device and the shiftable member and said locking device movable in one direction to shift the member from said locked position into a position to cause the clutch to function, and said locking device movable therefrom in the opposite direction for restoring the clutch to its locked, inoperative position.

18. In a device of the class described, the combination of a shaft, cams on the shaft, means forming a friction clutch including a shiftable element carried by the shaft and provided with means coacting with the cams to shift the element into its clutching position when the cams or clutch element tends to override the other, means for shifting the clutch element axially of the shaft into an inoperative position towards the cams, and means operable when the clutch element is in its inoperative non-clutching position to prevent relative rotary movement between the clutch element and the cams and thus prevent the cams from accidentally operating the clutch.

19. In a device of the class described, the combination of two members adapted to constitute a positive drive, synchronizing means for causing said members to approach the same speed, said means including a friction clutch and camming means operable on relative movement between the elements of the friction clutch for causing them to forcefully engage in their clutching relation and manually controlled means for securing the camming means in inoperative position thereby to avoid accidental functioning of the friction clutch.

20. In a device of the class described, the combination of a splined shaft, a rotative toothed member mounted for rotary movement about the axis of said shaft and otherwise fixed, an element of a friction clutch turning with said member, a coacting floating clutch element, a second toothed member splined to the shaft to turn therewith, movable in one direction to provide a positive drive with the first mentioned tooth member, a key-bar splined to the shaft to turn therewith and having a slight freedom of axial movement, an end of said key-bar and said clutch element provided with coacting means adapted when the bar is in one position to engage said floating clutch element to cause it to be held in rotatively fixed relation to the shaft to turn therewith and said key-bar movable in one direction to escape from its holding engagement with the clutch element and adapted to bear on the clutch element and shift the same into its friction clutching position and said friction clutch provided with means tending normally to maintain its elements in a spaced apart, inoperative position and releasable means controlled by said second member for shifting the key-bar to and from its friction clutch controlling position.

21. In a device of the class described, the combination of a splined shaft a rotative toothed member mounted for rotary movement about the axis of said shaft and otherwise fixed, an element of a friction clutch turning with said member, a coacting floating clutch element, a second toothed member splined to the shaft to turn therewith, movable in one direction to provide a positive drive with the first mentioned tooth member, a key-bar splined to the shaft to turn therewith and having a slight freedom of axial movement, an end of said key-bar and said clutch element provided with coacting means adapted when the bar is in one position to engage said floating clutch element to cause it to be held in rotatively fixed relation to the shaft to turn therewith and said key-bar movable in one direction to escape from its holding engagement with the clutch element and adapted to bear on the clutch element and shift the same into its friction clutching position.

22. In a device of the class described, the combination of two positive clutches, synchronizing means for causing the elements of each of said clutches to approach the same speed, said synchronizing means including two friction clutches mounted for rotary movement about a common axis and having their movable elements facing each other and axially movable relative to each other and each movable to and from its clutching engagement with its companion, a single control mechanism having a neutral position, and movable therefrom in one axial direction to cause the clutch element at its advance end to engage with its companion, said control mechanism including means disposed, when the mechanism is in said neutral position, to engage both movable elements to cause them to turn rotatively with the control mechanism, and said control mechanism when shifted in one direction or the other acting to move the element at its advance end into frictional engagement with its companion and simultaneously to lock the friction element at the other end so as to rotate with the control mechanism and thus defeat any tendency for said last named friction element to turn with its companion.

HOWARD J. MURRAY.